(12) United States Patent
Casner (10) Patent No.: US 8,393,205 B2
(45) Date of Patent: Mar. 12, 2013

(54) INFLATION VALVE AND PRESSURE GAUGE WITH OVER PRESSURE PROTECTION

(76) Inventor: Jonathan S. Casner, New Carlisle, OH (US)

( * ) Notice: Subject to any disclaimer, the term of this patent is extended or adjusted under 35 U.S.C. 154(b) by 658 days.

(21) Appl. No.: 12/620,060

(22) Filed: Nov. 17, 2009

(65) Prior Publication Data

US 2010/0180678 A1    Jul. 22, 2010

Related U.S. Application Data

(60) Provisional application No. 61/146,138, filed on Jan. 21, 2009.

(51) Int. Cl.
*B60C 23/02* (2006.01)
(52) U.S. Cl. ......................... 73/146.8; 73/146
(58) Field of Classification Search .............. 73/146, 73/146.2–146.3, 146.8; 72/146
See application file for complete search history.

(56) References Cited

U.S. PATENT DOCUMENTS

| | | | | |
|---|---|---|---|---|
| 3,631,677 | A * | 1/1972 | Williams | 60/243 |
| 3,996,957 | A * | 12/1976 | Goldish et al. | 137/224 |
| 4,944,726 | A * | 7/1990 | Hilal et al. | 604/143 |
| 5,694,969 | A | 12/1997 | DeVuyst | |
| 5,954,081 | A | 9/1999 | Everhard et al. | |
| 6,558,130 | B1 * | 5/2003 | Chang | 417/63 |
| 6,561,233 | B2 * | 5/2003 | Weems et al. | 141/38 |
| 7,207,365 | B2 | 4/2007 | Nelson et al. | |
| 7,302,837 | B2 | 12/2007 | Wendte | |
| 7,418,989 | B2 | 9/2008 | Ingram | |
| 7,615,031 | B2 * | 11/2009 | Bonnette et al. | 604/99.01 |

OTHER PUBLICATIONS

Firestone, Mazimize Tractive Performance of Radial Rear Tractor Tires with Proper Inflation, Technical Bulletins, May 1994, 2 pages, http:////wwww.firestoneag.com/techbulletins_article. asp?article=1271, retrieved Jan. 13, 2009.
Zenk, Peg, Tire trends: The low-pressure look, Farm Industry News, Clickability, Oct. 1, 2003, 4 pages, httt:// www.prinththis.clickablity.com/pt/cpt?action=cpt&title=Tire+trends%3A+The- . . . , retrieved Jan. 13, 2009.

* cited by examiner

*Primary Examiner* — Max Noori
(74) *Attorney, Agent, or Firm* — Standley Law Group LLP (57) ABSTRACT

An inflation and pressure measurement system having over pressure protection for an attached pressure gauge. A plunger is placed within an internal cavity of a valve body where the plunger can move axially into a first and a second position. In the first position there is gaseous communication between an inflation valve and an operating port. While in the first position, a gauge port may release gas through a wiper seal. In the second position there is gaseous communication between the operating port and the gauge port. The plunger may be biased in the second position. The first and second positions may be located by a locating groove in the plunger and a locating structure passing through the valve body and contacting the locating groove. While the inflatable device can be inflated using high pressures, the pressure gauge is protected from over pressure damage. Some embodiments can inflate and monitor the pressure of multiple inflatable devices from a single position.

12 Claims, 7 Drawing Sheets

INFLATION VALVE AND PRESSURE GAUGE WITH OVER PRESSURE PROTECTION

CROSS-REFERENCE TO RELATED APPLICATIONS

This application is a non-provisional patent application and claims priority to application No. 61/146,138 filed on Jan. 21, 2009, herein incorporated by reference in its entirety.

TECHNICAL FIELD

Exemplary embodiments generally relate to inflation valves in gaseous communication with pressure gauges.

BACKGROUND OF THE ART

Many inflatable products have a desired range for operating pressures, where the product is designed to perform optimally when pressurized within the desired range. Outside of these desired pressure ranges, the products may not perform at their highest level and may even become dangerous. Some inflatable products have been designed with built-in pressure gauges, which monitor the operating pressure of the device and provide some notification of the pressure to the user of the device. This notification may be in the form of a mechanical dial, electronic display, or some other form of mechanical notification such as a piston.

With tires for example, pressurizing within the desired operating pressure range can be very important. The performance and usable life of the tire as well as gas mileage may be significantly impacted. For off-road tires as well as tires which are used in the agriculture industry ('agriculture tires'), the pressurization may become even more important. Over inflation of off-road or agricultural tires may cause: loss of traction, excessive soil compaction, fast wear, higher fuel consumption, fewer acres tilled per day, and a harsh ride. Further, under inflation of off-road or agricultural tires may cause: sidewall damage, a poor ride, bead un-seating, and fast wear. Thus, for optimum performance, it is desired to maintain the desired pressure ranges for tires, and any other inflatable products.

However, many agriculture tires, as well as other inflatable products require relatively low operating pressures (ex. 15 PSI) but are frequently inflated with compressors which inject air at a much higher pressure (ex. 90-175 PSI). If a gauge is used to monitor the pressure of the tire, this gauge is typically designed to handle the low operating pressure of the tire and not the high pressure of the compressor. Exposing the low-pressure gauge to the high-pressure incoming air can result in damage to the low-pressure gauge.

SUMMARY OF THE EXEMPLARY EMBODIMENTS

The embodiments herein provide an inflation system in gaseous communication with a pressure gauge. Exemplary embodiments allow highly pressurized air, gas, or fluids to enter the inflatable product without over pressurizing the pressure gauge.

The foregoing and other features and advantages of the exemplary embodiments will be apparent from the following more detailed description of the particular embodiments of the invention, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
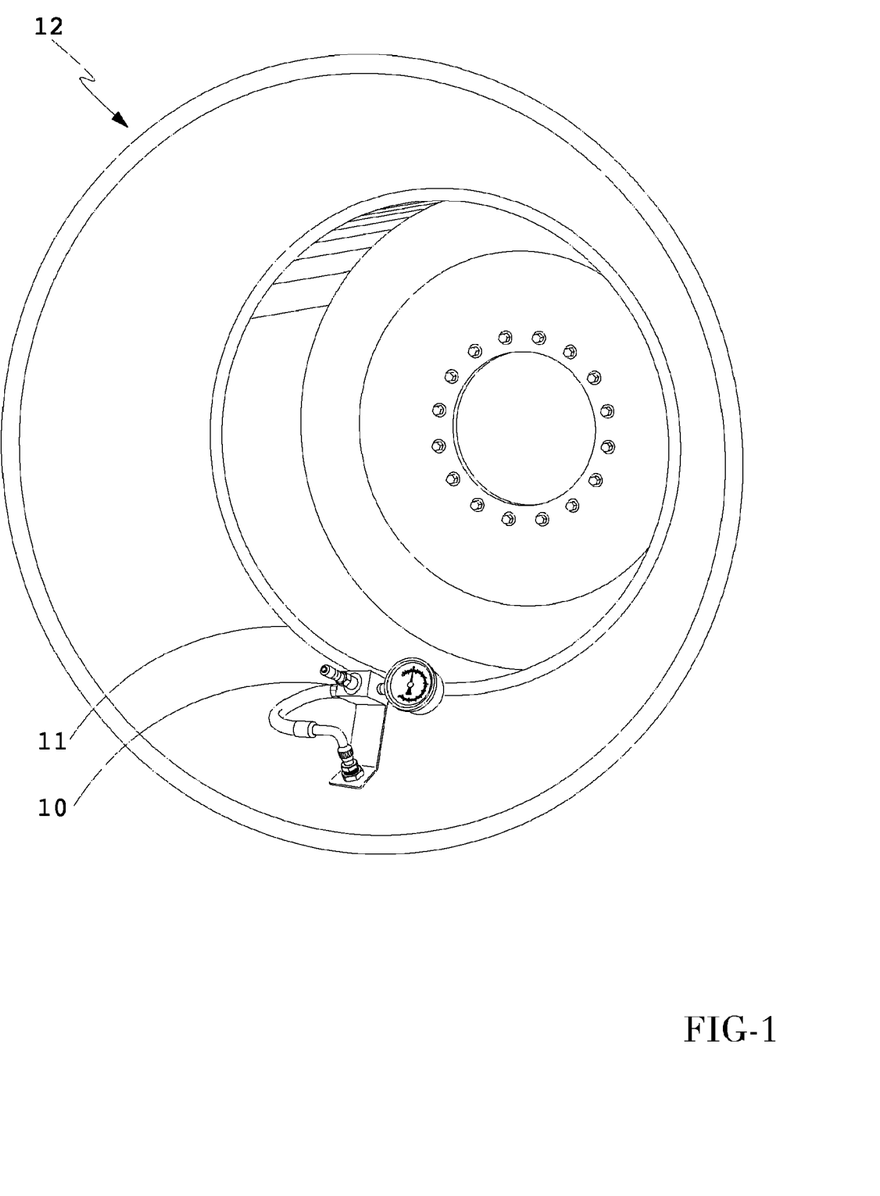
FIG. 1 is a perspective view of an embodiment installed within a large off-road tire.
Figure 2:
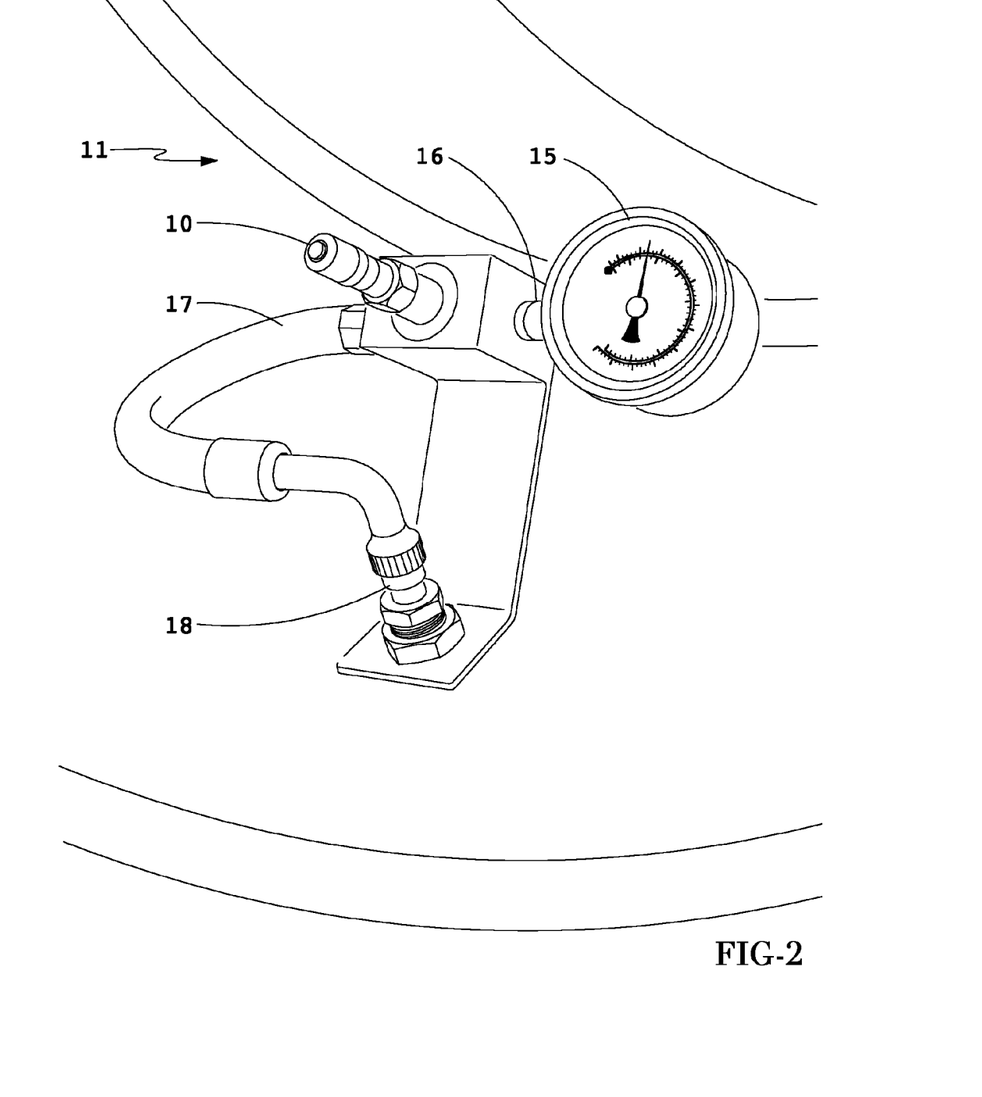
FIG. 2 is a perspective view of another embodiment showing the gauge and operating lines.

FIG. 1 shows an exemplary valve 10, mounted to the rim 11 of a large off-road tire 12. FIG. 2 shows another exemplary valve 10, mounted to the rim 11 of a large off-road tire. The valve 10 connects to gauge line 16 which connects to the gauge 15. The valve 10 also connects to operating line 17 which connects to the tire stem 18. During inflation, the valve 10 allows air to travel through the operating line 17 and into the tire through the tire stem 18. The highly pressurized air entering the valve 10 during inflation is not permitted to enter the gauge line 16 or the gauge 15. Once inflation is complete, the connection between the gauge line 16 and the valve 10 is restored and the pressure of the tire may then be safely measured by gauge 15.

Figure 3A:
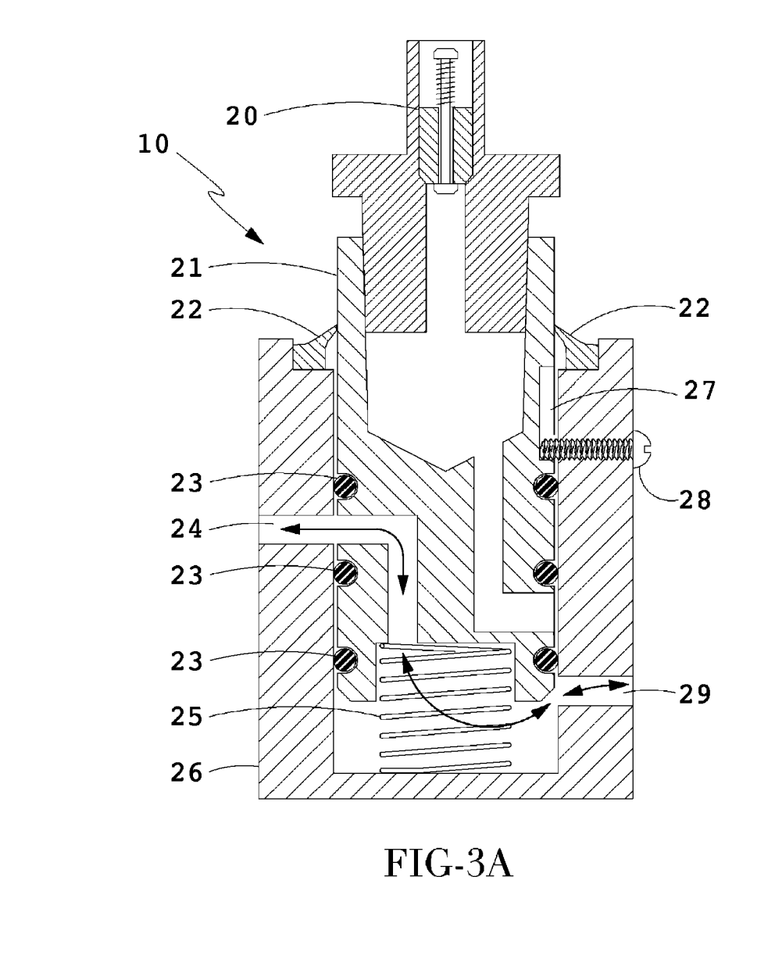
FIG. 3A is a sectional view of an exemplary embodiment where the plunger is in the extended position.

FIG. 3A shows a sectional view of an exemplary valve 10. The plunger 21 fits within the valve body 26 and is permitted to stroke up and down within the valve body 26. One or more O-rings 23 may be used to provide a seal between the plunger 21 and the valve body 26. A wiper seal 22 may also be used to provide a seal between the plunger 21 and valve body 26. A locating groove 27 may be used with a set screw 28 to determine the maximum distance that the plunger 21 may stroke up and down relative to the valve body 26. A compression spring 25 provides an upward force on the plunger 21 and holds the plunger in the 'up' position, which is the position shown in FIG. 3A. This position represents the orientation of the valve 10 when inflation is not desired. In this position, there is a gaseous connection between the gauge port 24 and the operating port 29. The operating port 29 connects to the air within the inflatable product and when in communication with the gauge port 24 can provide pressure data to the gauge (see FIG. 2).

Figure 3B:
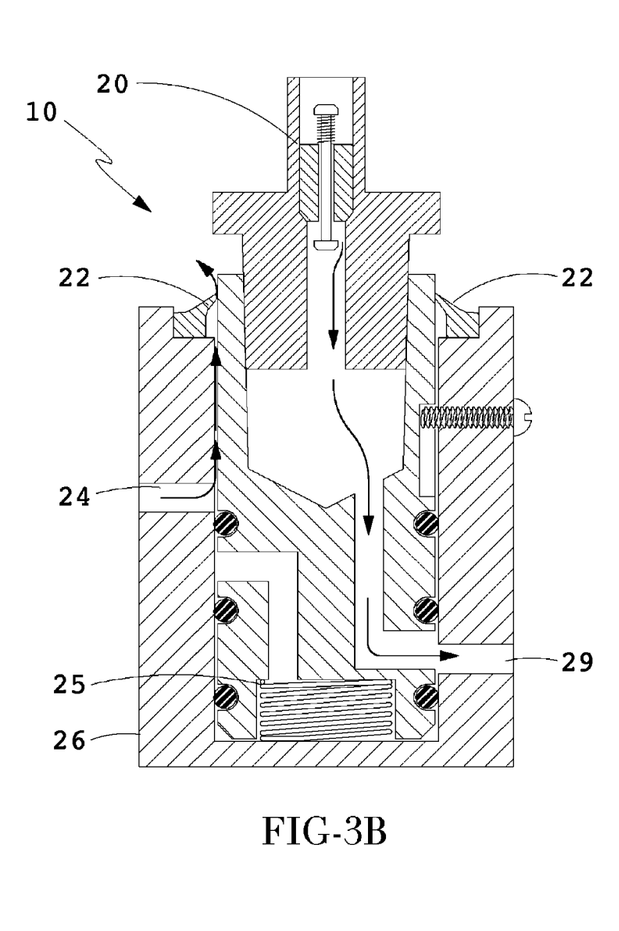
FIG. 3B is a sectional view of an exemplary embodiment where the plunger is in the depressed position.

FIG. 3B shows a sectional view of the valve 10 from FIG. 3A but now in the 'down' position where the product is being inflated. An inflation valve 20 permits compressed air to enter the plunger 21. In an exemplary embodiment, the inflation valve 20 may be a Schrader valve. As the plunger 21 strokes down, the previous gaseous communication between the operating port 29 and gauge port 24 is closed and a new gaseous communication is established between the inflation valve 20 and the operating port 29. The inflation valve 20 may be opened, and permit compressed air to enter the plunger 21 and travel to the operating port 29, thus inflating the product.

This allows the product to be inflated with highly compressed air while bypassing the gauge port 24 and preventing possible damage to the gauge (see FIG. 2). Also, the gauge port 24 is permitted to vent by allowing air to travel between the plunger 21 and valve body 26 and exiting through the wiper seal 22.

Figure 4:
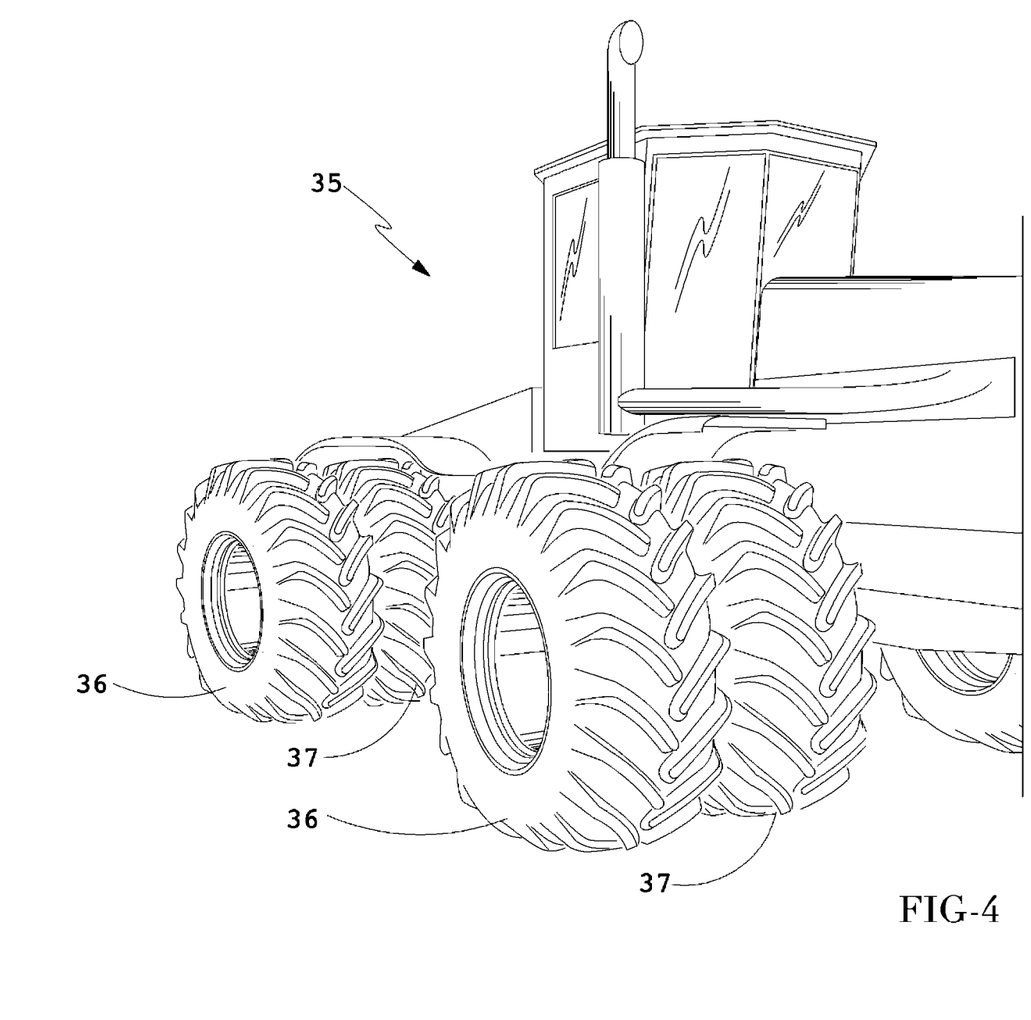
FIG. 4 is a perspective view of an off-road vehicle with multiple tires installed on the end of each axle.
Figure 5:
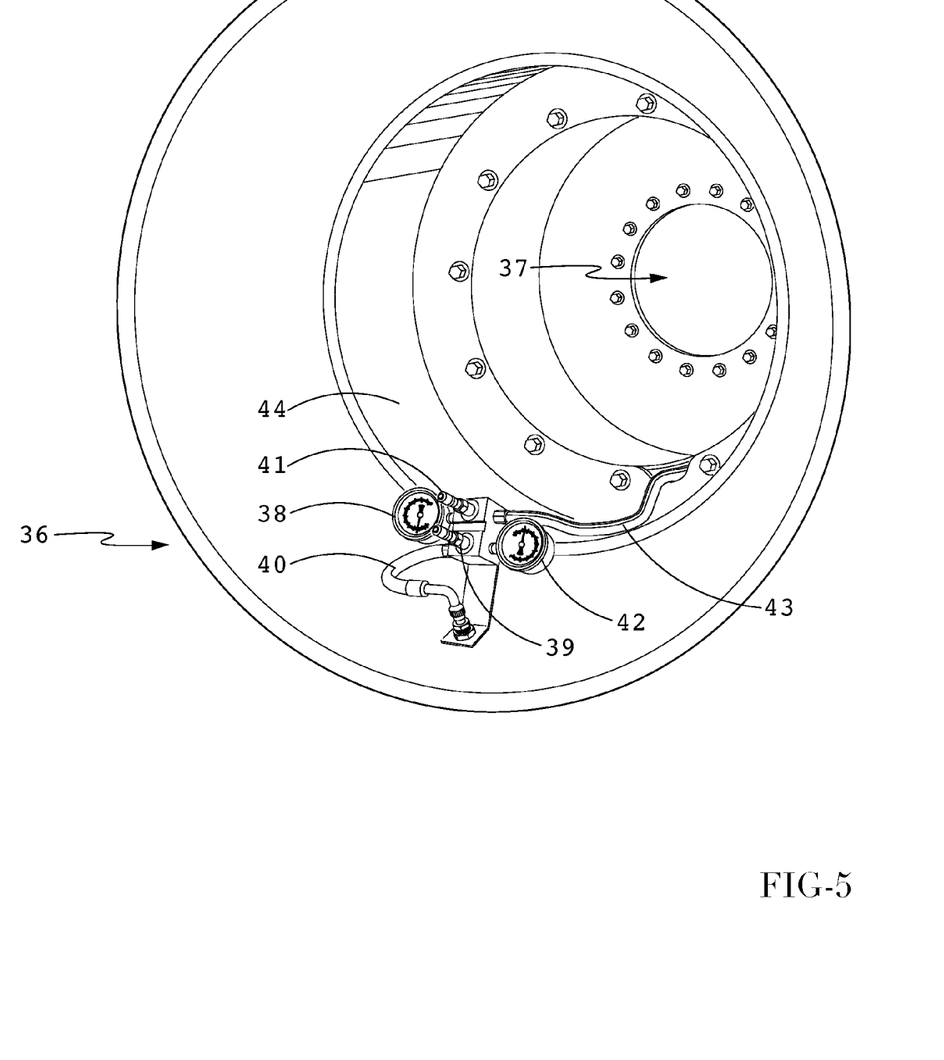
FIG. 5 is a perspective view of an embodiment where multiple tires can be inflated from a single position and the pressure of multiple tires can be measured from a single position and the rim of the outer tire is hollow.

FIG. 4 shows an off-road vehicle 35 where a first 36 and second tire 37 is installed on the end of each axle. FIG. 5 shows an embodiment where a first 36 and second tire 37 may be inflated from a single position and their pressures monitored also from this single position. A first tire 36 is inflated by a first valve 39 and measured by a first pressure gauge 38. A first operating line 40 connects the first valve 39 to the first tire 36. A second tire 37 is inflated by a second valve 41 and measured by a second pressure gauge 42. A second operating line 43 connects the second valve 41 to the second tire 37. Here, where the rim of the first tire is hollow, the second operating line 43 may simply pass through the open section 44 to access the second tire 37.

Figure 6:
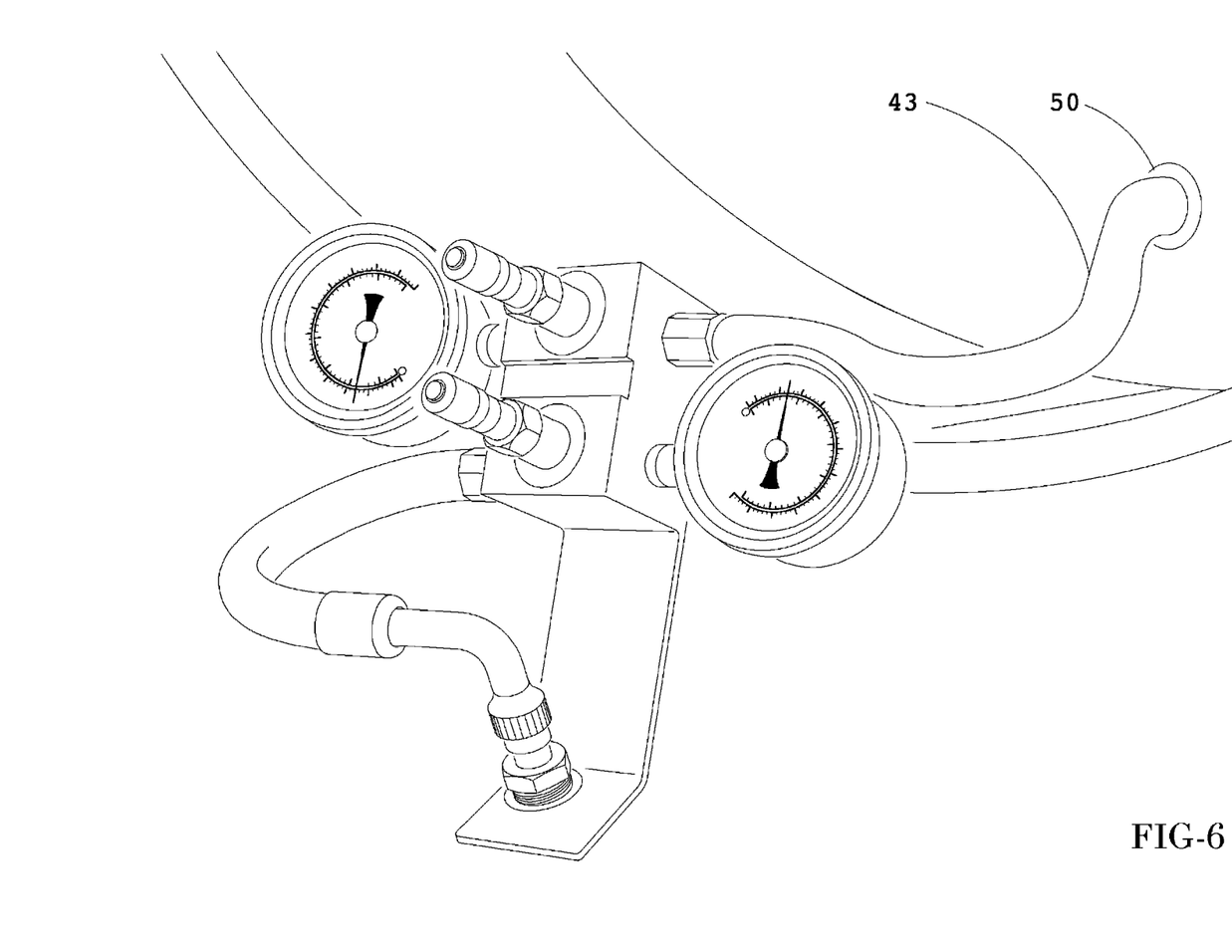
FIG. 6 is a perspective view of an embodiment where multiple tires can be inflated from a single position and the pressure of multiple tires can be measured from a single position and the rim of the outer tire is closed.
Figure 7:
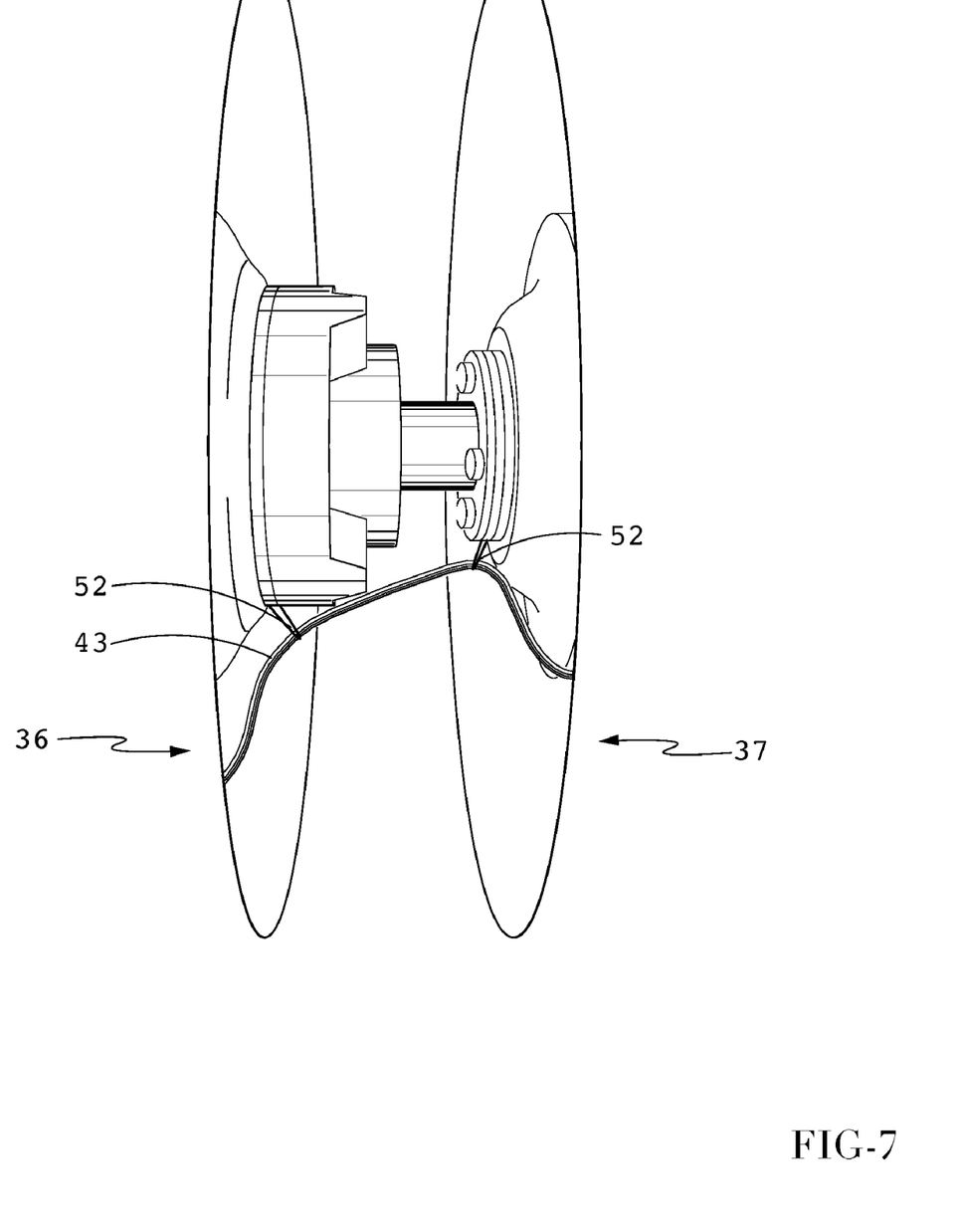
FIG. 7 is a side view between two tires which are installed on the end of an axle.

FIG. 6 shows an embodiment where the rim of the first tire 36 is closed. Here, an access hole 50 may be used to allow the second operating line 43 to access the second tire 37. FIG. 7 shows the second operating line 43 after passing though the access hole 50. The second operating line 43 may be secured by one or more securing means 52 to ensure that it does not entangle with ground surface debris, vegetation, etc. Any number of tires may be attached to the end of an axle and may be used with any of the embodiments herein.

With the embodiments shown in FIGS. 4 through 7, any number of adjacent tires may be inflated from a single position. This inflation may be accomplished without the risk of over inflating the pressure gauges for each tire. Further, the pressure of each tire may also be measured from a single position.

It should be noted, that although some of the valve embodiments have been described with respect to 'air', embodiments may be used for the inflation of products with any type of gas or fluid. Further, embodiments are not limited to tires, but may be used with any type of inflatable product which may be inflated at a pressure that is higher than its desired operating pressure. Applications include, but not limited to: hydraulic cylinders, pneumatic cylinders, water vessels, bladders, kites, amusement devices (bouncing rooms, slides, rock walls), water trampolines, building roofs, waterslides, lawn decorations, air mattresses, costumes, swim rings, movie screens, and swimming pool toys.

Having shown and described preferred embodiments, those skilled in the art will realize that many variations and modifications may be made to affect the described embodiments and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

The invention claimed is:

1. A system for inflation and pressure measurement with over pressure protection, the system comprising:
   a valve body comprising:
      a sidewall and bottom defining an internal cavity with an opening and a central axis,
      a gauge port passing through the valve body sidewall, and
      an operating port passing through the valve body sidewall;
   a pressure gauge in gaseous communication with the gauge port;
   a plunger, aligned for axial movement within the valve body between an first and
      a second position, the plunger having sidewalls surrounding a hollow center and further comprising:
      an inflation valve passing through a plunger sidewall,
      a locating groove within a plunger sidewall and adjacent to the valve body sidewall,
      a first pathway passing through a plunger sidewall and providing gaseous communication between the inflation valve and the operating port when the plunger is in the first position, and
      a second air pathway providing gaseous communication between the operating port and the gauge port when the plunger is in the second position;
   a compression spring between the valve body and the plunger; and
   a locating structure passing through the valve body sidewall and contacting the locating groove of the plunger, limiting the axial movement of the plunger in the first and second positions.

2. The inflation and pressure measurement system of claim 1 further comprising:
   an O-ring between the valve body and plunger.

3. The inflation and pressure measurement system of claim 1 further comprising:
   a wiper seal between the plunger and valve body, and
   a third pathway passing through the wiper seal and providing a gaseous communication between the gauge port and the surrounding atmosphere when the plunger is in the first position.

4. The inflation and pressure measurement system of claim 1 further comprising:
   an inflatable product in gaseous communication with the operating port.

5. The inflation and pressure measurement system of claim 1 wherein:
   the inflation valve is a Schrader valve.

6. The inflation and pressure measurement system of claim 1 wherein:
   the locating structure is a set screw.

7. A system for inflating and monitoring the pressure of off-road tires comprising:
   a first off-road tire having a rim and a tire stem; and
   a first inflation and pressure measurement system as described in claim 1, mounted on the rim of the first off-road tire where the operating port is in gaseous communication with the tire stem.

8. The off-road tire inflation and pressure monitoring system of claim 7 further comprising:
   a second inflation and pressure measurement system as described in claim 9 and mounted to the rim of the first off-road tire; and
   a second off-road tire adjacent to the first off-road tire and having a tire stem in gaseous communication with the operating port of the second inflation valve.

9. The off-road tire inflation and pressure monitoring system of claim 7 further comprising:
   an O-ring between the valve body and plunger of the first and second inflation and pressure measurement systems.

10. The off-road tire inflation and pressure monitoring system of claim 7 further comprising:

a wiper seal between the plunger and valve body of the first and second inflation and pressure measurement system.

11. The off-road tire inflation and pressure monitoring system of claim 7 wherein:
the inflation valves for the first and second inflation and pressure measurement systems are Schrader valves.

12. The off-road tire inflation and pressure monitoring system of claim 7 wherein:
the gaseous communication between the operating port of the second inflation and pressure measurement system and the tire stem of the second tire is provided by an operating line which passes through the rim of the first tire.

* * * * *